United States Patent
Pezeshki et al.

(10) Patent No.: US 11,483,182 B2
(45) Date of Patent: Oct. 25, 2022

(54) OPTICAL TRANSCEIVER DESIGN FOR SHORT DISTANCE COMMUNICATION SYSTEMS BASED ON MICROLEDS

(71) Applicants: Bardia Pezeshki, Sunnyvale, CA (US); Robert Kalman, Sunnyvale, CA (US); Alex Tselikov, Sunnyvale, CA (US)

(72) Inventors: Bardia Pezeshki, Sunnyvale, CA (US); Robert Kalman, Sunnyvale, CA (US); Alex Tselikov, Sunnyvale, CA (US)

(73) Assignee: AVICENATECH CORP., Mountain View, CA (US)

( * ) Notice: Subject to any disclaimer, the term of this patent is extended or adjusted under 35 U.S.C. 154(b) by 0 days.

(21) Appl. No.: 17/145,082

(22) Filed: Jan. 8, 2021

(65) Prior Publication Data

US 2021/0211331 A1 Jul. 8, 2021

Related U.S. Application Data

(60) Provisional application No. 62/958,613, filed on Jan. 8, 2020.

(51) Int. Cl.
| | | |
|---|---|---|
| H04B 10/00 | (2013.01) |
| H04L 25/03 | (2006.01) |
| H04B 10/40 | (2013.01) |
| H04B 10/60 | (2013.01) |
| H04B 10/50 | (2013.01) |
| H04L 7/02 | (2006.01) |

(52) U.S. Cl.
CPC ....... *H04L 25/03012* (2013.01); *H04B 10/40* (2013.01); *H04B 10/502* (2013.01); *H04B 10/60* (2013.01); *H04L 7/02* (2013.01)

(58) Field of Classification Search
CPC ..... H04L 25/03012; H04L 7/02; H04B 10/40; H04B 10/502; H04B 10/60; H04B 10/50; H04B 10/116; H04B 10/1149; H04B 10/1143; H04B 10/11; H04B 10/1123; H04B 1/52; H04B 10/0775; H04B 10/07951
USPC ....... 398/135–138, 128, 130, 158, 159, 160, 398/192, 193, 202, 208
See application file for complete search history.

(56) References Cited

U.S. PATENT DOCUMENTS

| | | |
|---|---|---|
| 5,335,361 A | 8/1994 | Ghaem |
| 5,638,469 A | 6/1997 | Feldman et al. |
| 5,848,214 A | 12/1998 | Haas et al. |
| 7,459,726 B2 | 12/2008 | Kato et al. |
| 7,915,699 B2 | 3/2011 | Krishnamoorthy et al. |

(Continued)

FOREIGN PATENT DOCUMENTS

JP 2011-014932 A 1/2011

OTHER PUBLICATIONS

J. F. C. Carreira et al., Direct integration of micro-LEDs and a SPAD detector on a silicon CMOS chip for data communications and time-of-flight ranging, Optics Express, vol. 28, No. 5, Mar. 2, 2020, pp. 6909-6917.

(Continued)

*Primary Examiner* — Hibret A Woldekidan
(74) *Attorney, Agent, or Firm* — KOS IP Law LLP

(57) ABSTRACT

MicroLEDs may be used for short-range optical communications. Signal equalization may be used to decrease distortion in transmitted and/or received information, including with the use of multi-level modulation formats.

5 Claims, 18 Drawing Sheets

(56) References Cited

U.S. PATENT DOCUMENTS

| | | |
|---|---|---|
| 8,148,202 B2 | 4/2012 | Krishnamoorthy et al. |
| 2004/0159777 A1 | 8/2004 | Stone |
| 2016/0020353 A1 | 1/2016 | Chu |
| 2016/0172020 A1 | 6/2016 | Baker et al. |
| 2016/0233269 A1 | 8/2016 | Choi et al. |
| 2017/0276874 A1 | 9/2017 | Kashyap et al. |
| 2018/0227055 A1* | 8/2018 | Khatibzadeh ........... H01L 33/04 |
| 2019/0013867 A1* | 1/2019 | Ling .................... H04B 10/516 |
| 2019/0049367 A1 | 2/2019 | Zou |
| 2019/0189603 A1 | 6/2019 | Wang et al. |
| 2020/0111404 A1* | 4/2020 | Kim ..................... G09G 3/2014 |

OTHER PUBLICATIONS

Martin D. Dawson, Micro-LEDs for Technological Convergence between Displays, Optical Communications, & Sensing and Imaging Systems, SID Display Week 2020, Session 44, Invited paper No. 44.1, 27 pages.

Lars Brusberg et al., Optoelectronic Glass Substrate for Co-packaged Optics and ASICs, Optical Fiber Communication Conference, Mar. 12, 2020, San Diego, CA, pp. 1-24.

Roger Dangel et al., Polymer Waveguides Enabling Scalable Low-Loss Adiabatic Optical Coupling for Silicon Photonics, IEEE Journal of Selected Topics In Quantum Electronics, vol. 24, No. 4, Jul./Aug. 2018, 11 pages.

Ziyang Zhang et al., Hybrid Photonic Integration on a Polymer Platform, Photonics 2015, 2, pp. 1005-1026.

David A. B. Miller, Optical Interconnects, IAA Workshop, Jul. 22, 2008, pp. 1-26.

Brian Corbett et al., Chapter Three—Transfer Printing for Silicon Photonics, Semiconductors and Semimetals, vol. 99, 2018, ISSN 0080-8784, pp. 43-70, https://doi.org/10.1016/bs.semsem.2018.08.001.

Yurii Vlasov, Silicon photonics for next generation computing systems, Tutorial given at the European Conference on Optical Communications, Sep. 22, 2008.

Bing Wang et al., On-chip Optical Interconnects using InGaN Light-Emitting Diodes Integrated with Si-CMOS, In: Aais Communications and Photonics Conference 2014, Shanghai, China, Nov. 11-14, 2014, pp. 1-3.

Lei Liu et al., On-chip optical interconnect on silicon by transfer printing, In: CLEO: Science and Innovations 2018, San Jose, California, USA, May 13-18, 2018, pp. 1-2.

* cited by examiner

OPTICAL TRANSCEIVER DESIGN FOR SHORT DISTANCE COMMUNICATION SYSTEMS BASED ON MICROLEDS

CROSS REFERENCE TO RELATED APPLICATION

This application claims the benefit of the filing date of U.S. Provisional Patent Application No. 62/958,613, filed on Jan. 8, 2020, the disclosure of which is incorporated by reference herein.

FIELD OF THE INVENTION

The present invention relates generally to optical communications, and more particularly to optical communications over short distances using microLEDs.

BACKGROUND OF THE INVENTION

Lasers tend to dominate optical communications on account of their narrow linewidth, single spatial mode output, and high-speed characteristics. However, these may not be important for optical communications for very short distances, such as chip to chip communications.

BRIEF SUMMARY OF THE INVENTION

Some embodiments provide a transceiver for short distance communication using microLEDs, comprising: a microLED driver; a de-emphasis signal converter/feed forward equalizer to equalize a signal from the microLED driver; a microLED configured to be driven by the equalized signal and to emit light into an optical communications channel; a photodetector configured to receive light from the optical communications channel; a transimpedance amplifier to amplify an electrical signal from the photodetector; and an equalizer to equalize the amplified electrical signal.

These and other aspects of the invention are more fully comprehended upon review of this disclosure.

DETAILED DESCRIPTION

Figure 1:
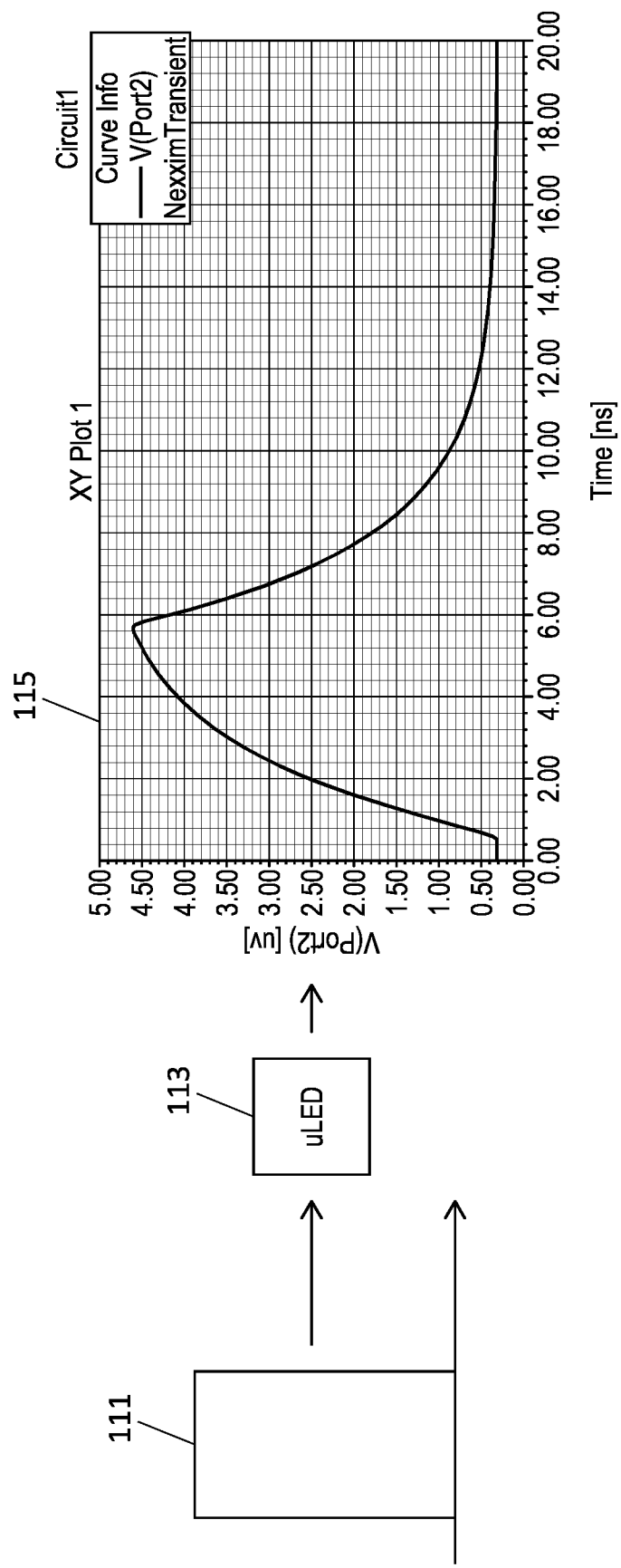
FIG. 1 shows a typical response of a bandlimited microLED to a current pulse.
Figure 2:
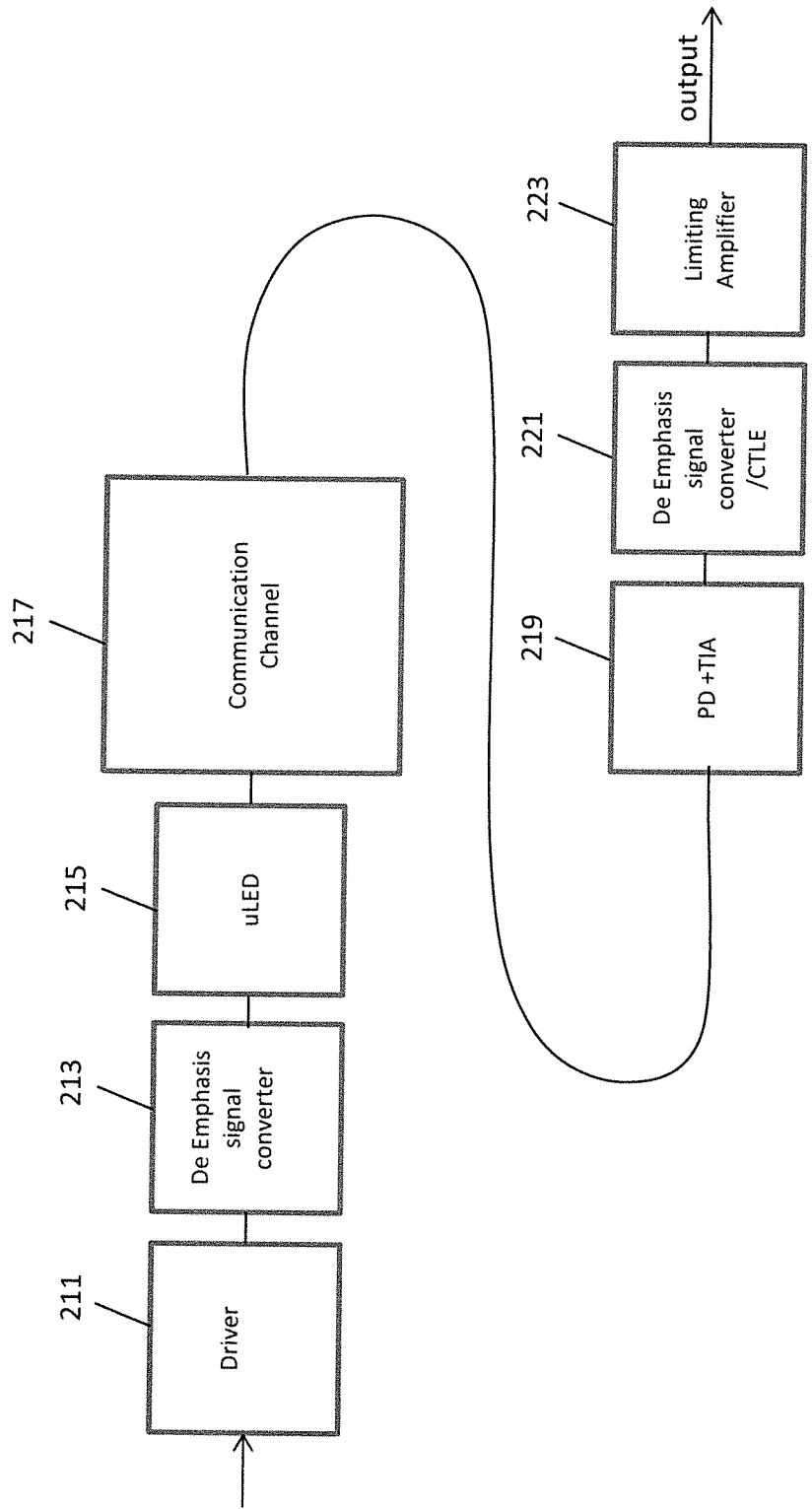
FIG. 2 shows a block diagram of a transceiver in accordance with aspects of the invention.

In some embodiments microLEDs, for example GaN based microLEDs are used for integrated circuit chip-to-chip communications, and/or in some embodiments intra-chip communications. GaN microLEDs have substantial advantages over lasers in that they do not have a significant threshold current. Though quantum efficiency is a function of drive current, there is no discrete threshold level, and moreover, microLEDs can be run at far lower currents than lasers. GaN microLEDs have far superior high temperature performance and reliability over semiconductor lasers. Moreover, GaN based microLEDs have been developed for display applications and a packaging eco-system has been developed for mounting devices on silicon CMOS or poly-silicon-on-glass backplanes.

Some embodiments utilize signal equalization. Equalization may often be considered the reversal of a signal distortion acquired by the signal transmitted through a channel (optical waveguide). Physical impairments in the optical fibers, such as chromatic dispersion, polarization effects, fiber non-linarites, amplified spontaneous emission. For short distance communication using microLEDs in chip-to-chip interconnect applications, distortions due to the optical waveguide, chromatic dispersion, waveguide non-linearities are generally negligible, compared to the limited modulation bandwidth of microLEDs.

Some embodiments utilize multi-level M'ary pulse amplitude modulation (PAM). PAM N (N is the number of logic levels) also allows transmission of optical signal through a bandlimited channel. Transmitting multiple bits per symbol allows more efficient use of the bandwidth than the binary PAM modulation format at the expense of signal to noise ratio SNR. Instead of increasing the modulation bandwidth of microLEDs, the data rate may be doubled by using a PAM-4 modulation format and increasing the SNR by 5 dB.

In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA. In some embodiments a microLED is distinguished from a standard LED by (1) having an emitting region of less than 10 µm×10 µm; (2) frequently having positive and negative contacts on top and bottom surfaces, whereas a standard LED typically has both positive and negative contacts on a single surface; (3) typically being used in large arrays for display and interconnect applications.

One difficulty in using a microLED for short data communication is their long recombination time, which may limit the modulation bandwidth of microLEDs. The limited modulation bandwidth of microLED may act as a channel distortion in the short distance communication link.

The modulation speed of microLED may be limited by the capacitance of the microLED and the carrier recombination time (dynamic capacitance). The capacitance forms an RC circuit with the drive output impedance thus resulting in the roll-off at higher modulation frequencies. The carrier lifetime means that the LED takes time to turn off, as it takes time for the minority injected carriers to recombine for the light emission to cease, even after the electrical pulse has ended. The modulation response of the microLED due to the long carrier recombination time may also result in a low pass-filter like behavior. FIG. 1 shows a typical response 115 of a bandlimited microLED 113 to a square current pulse 111. The response reveals low pass filter behavior due to the effects of capacitance and long carrier lifetime in the recombination region of the microLED. In some embodiments a device structure to reduce the recombination time or sweep the carriers away may use a tilted charge transistor-like structure.

Alternatively, a system approach can be used to overcome the limitations of the modulation bandwidth of the microLEDs used in short distance communication applications, such as IC chip to chip interconnects. For both RX and TX sides applying equalization, for example, allows to compensate for the channel impairments. Finite and Infinite response (FIR and IIR) filters are used to implement the equalizer. Bandwidth efficient modulation formats, such as a multilevel PAM modulation, can also be used to achieve the required transmission speed for a bandlimited channel. Multilevel modulation formats, however, require higher signal to noise ratio than a simple NRZ (PAM-2).

In some embodiments a transmitter/receiver uses bandwidth limited microLEDs for high speed short reach communication applications, such as chip-to-chip interconnect, intra-chip interconnect, optical clock distribution or optically enhanced interposer. Some embodiments use de-emphasis circuitry, which may be in the form of feed-forward equalizers (FFEs), to process signals driving the microLEDs. Some embodiments use equalizers, which may be in the form of continuous time linear equalizers (CTLEs) or decision feedback equalizers (DFEs), to process electrical signals provided by photodiodes receiving light from the microLEDs. Some embodiments use a multi-level signaling scheme, for example an M-ary pulse amplitude modulation (PAM) scheme, such as PAM-4, for transmission of information using the microLEDs.

Figure 3:
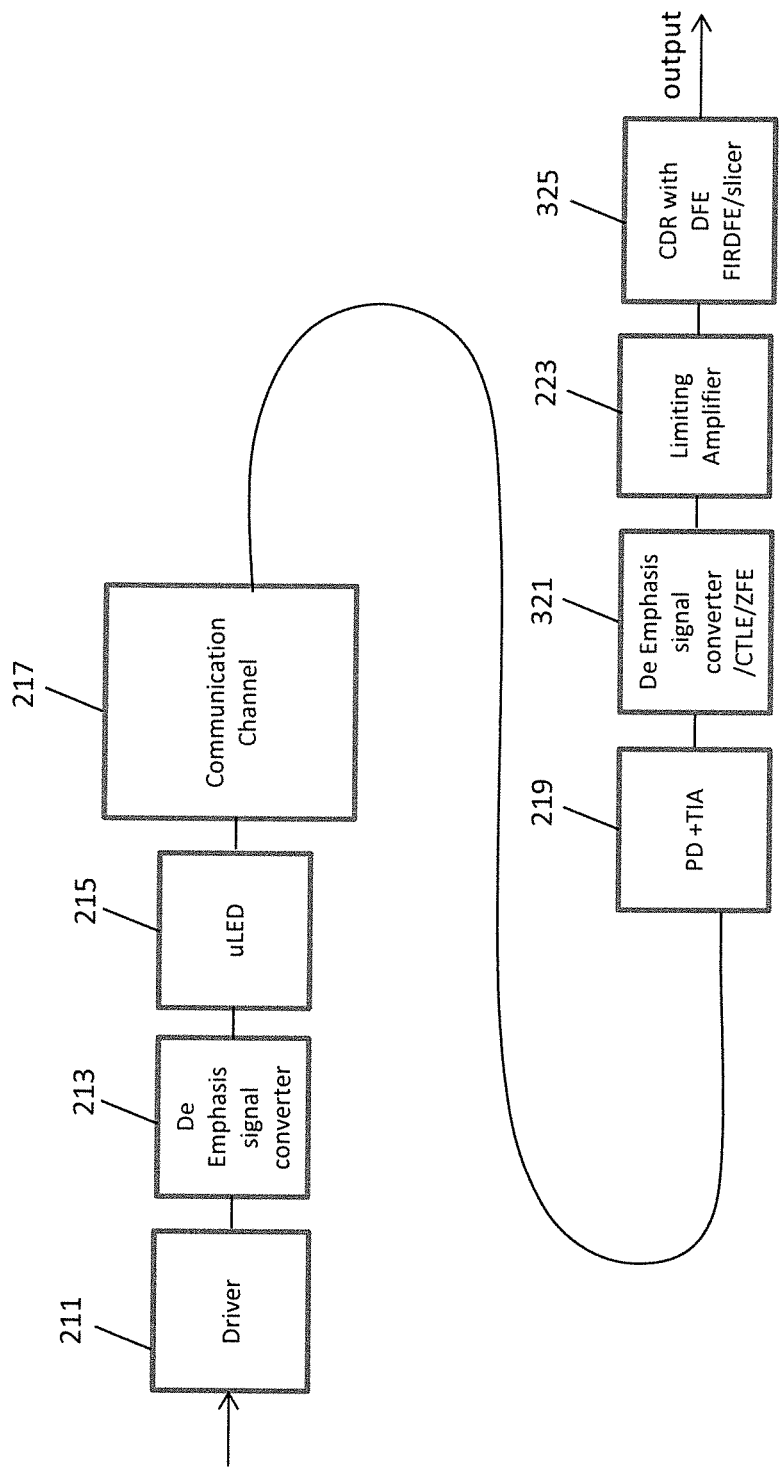
FIG. 3 shows a block diagram of a further transceiver in accordance with aspects of the invention.
Figure 4A:
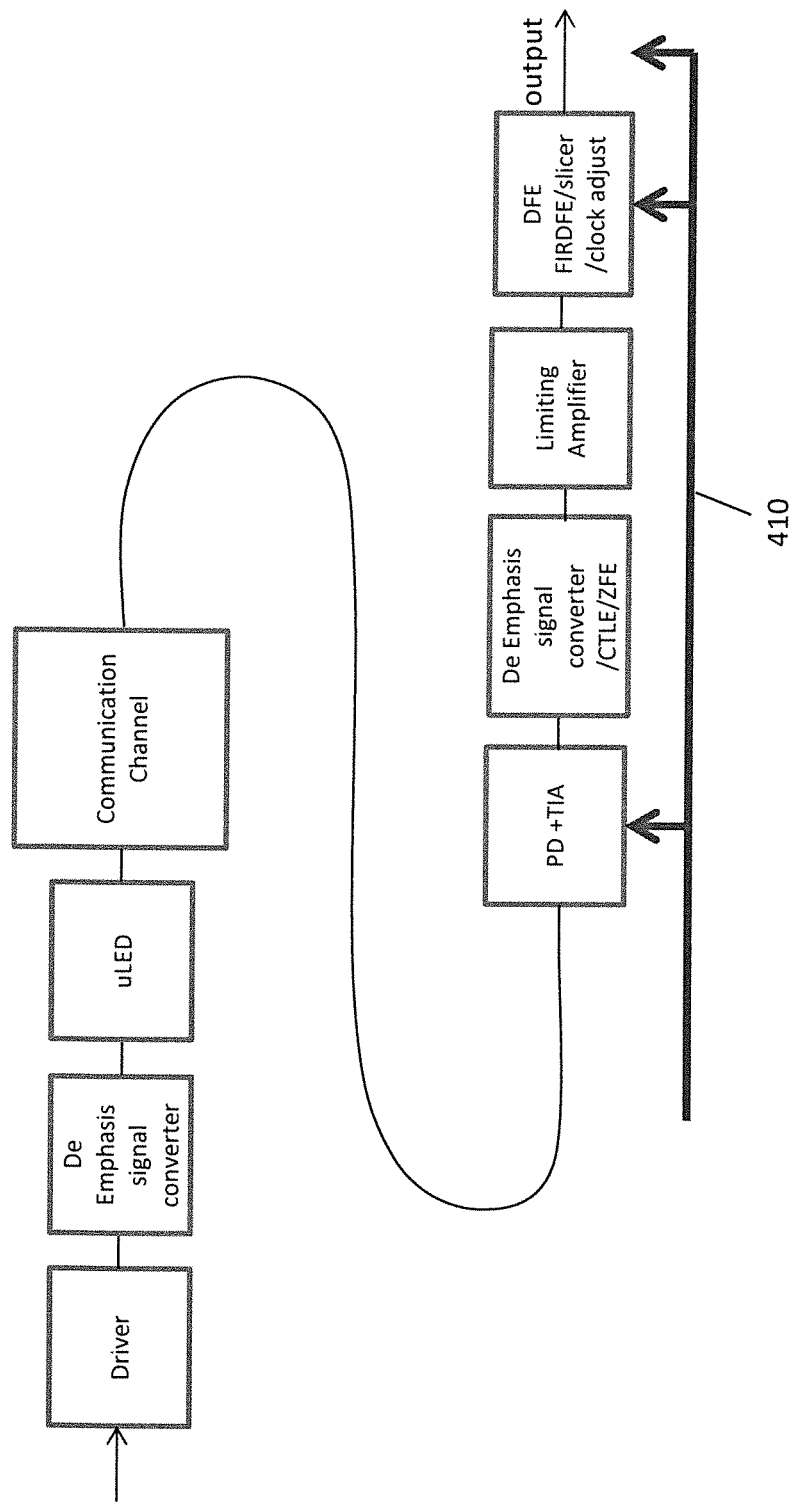
FIG. 4a shows a block diagram of a yet further transceiver in accordance with aspects of the invention.
Figure 4B:
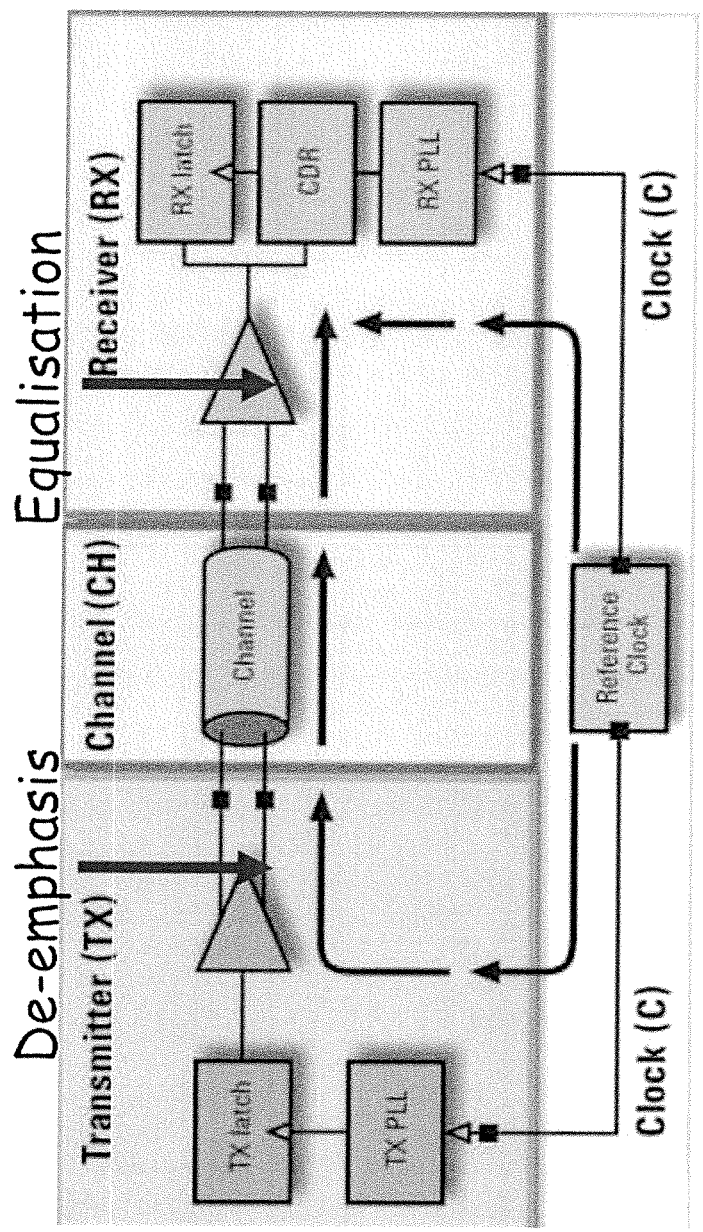
FIG. 4b shows a pseudo-block diagram, pseudo-schematic of a transceiver in accordance with aspects of the invention.

Some embodiments provide a transceiver architecture for short distance communication using microLEDs. FIGS. 2-4b show block diagrams transceivers in accordance with aspects of the invention, with FIG. 4b also showing a pseudo-block diagram, pseudo-schematic of a transceiver. The transceivers may comprise: a microLED driver 211, a de-emphasis signal converter/feed forward TX equalizer 213 to receive a signal from the microLED driver and equalize the signal, a microLED 215 driven by the equalized signal, a light wave communication channel 217 passing light from the microLED, a photodetector 219 to receive the light from the communication channel and a transimpedance amplifier 219 to amplify an electrical signal from the photodetector, an equalizer 221 to equalize the amplified signal, and, in some embodiments, a limiting amplifier 223 to amplify the equalized amplified signal. The output signal may be taken directly from the limiting amplifier. The de-emphasis or continuous time linear equalizer may be used to correct for channel distortion. Taps of the de-emphasis filter may be preset according to measured channel distortion. In FIG. 3, a slicer and DFE equalizer 325 may be used to vary a decision threshold. A clock is recovered from the incoming optical signal. Taps of the de-emphasis filter and DFE may be preset according to measured channel distortion and optimized for minimum bit error rate (BER). In FIG. 4a, a clock may be taken from a transmission side of the transceiver to a receiver side of the transceiver on an impedance matched copper wire or by a dedicated clock distribution optical link. One clock line may be used per a wide optical link. The clock can be used for a clock and data recovery (CDR) function of the decision feedback equalizer (DFE) or for integrating TIA sampling. The light wave communication channel may couple chips within a package of a multi-chip module, or chips on a common substrate.

In some embodiments the microLED has a high voltage (~3.3V) DC bias. In some embodiments the microLED Driver takes a logic voltage signal and outputs the drive current to the microLEDs. The input of the driver may be mounted directly to the chip and in many embodiments does not use impedance controlled 50 Ohm lines.

Figure 5:
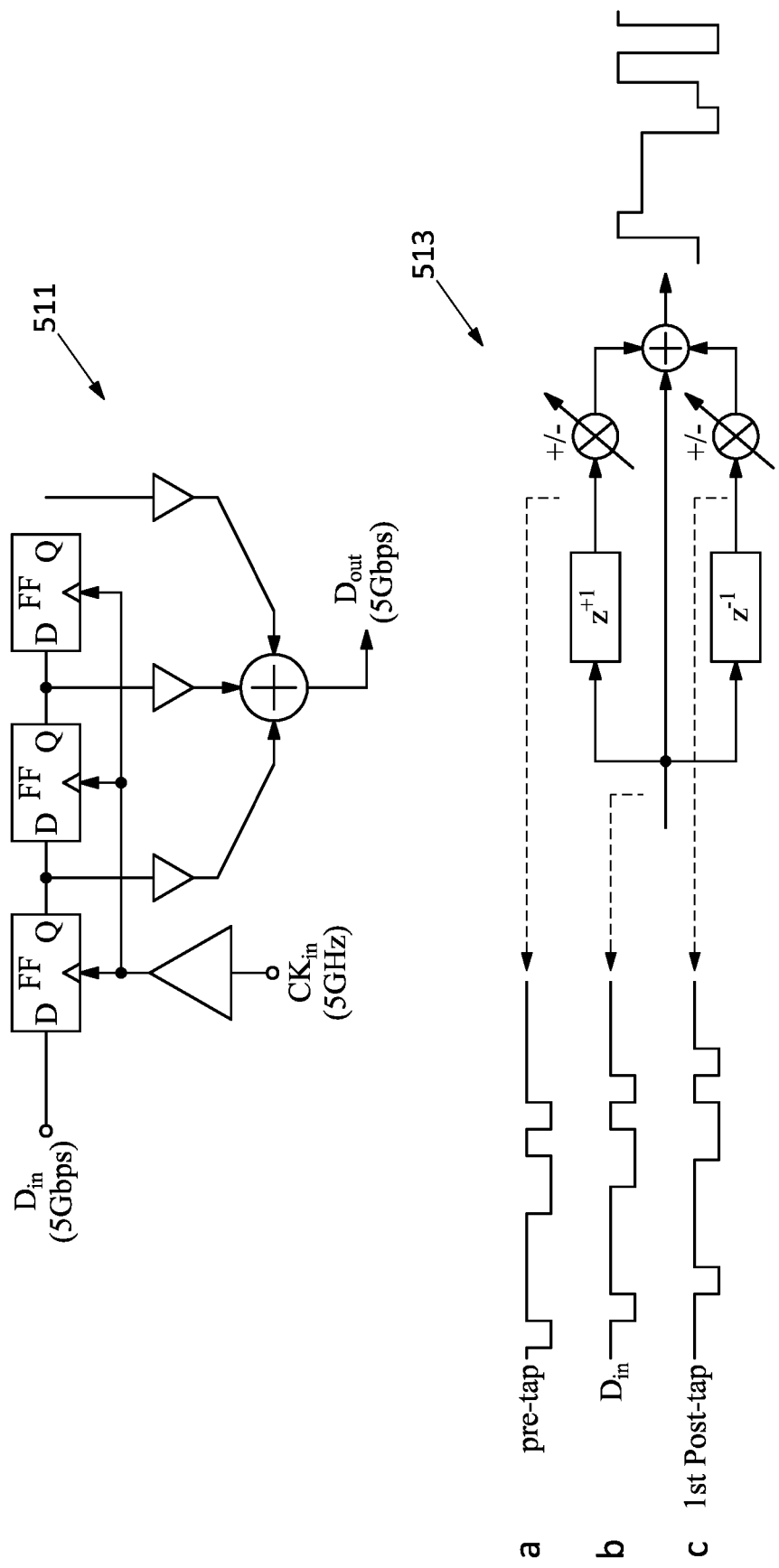
FIG. 5 shows an example de-emphasis signal converter/feed forward equalizer.
Figure 6:
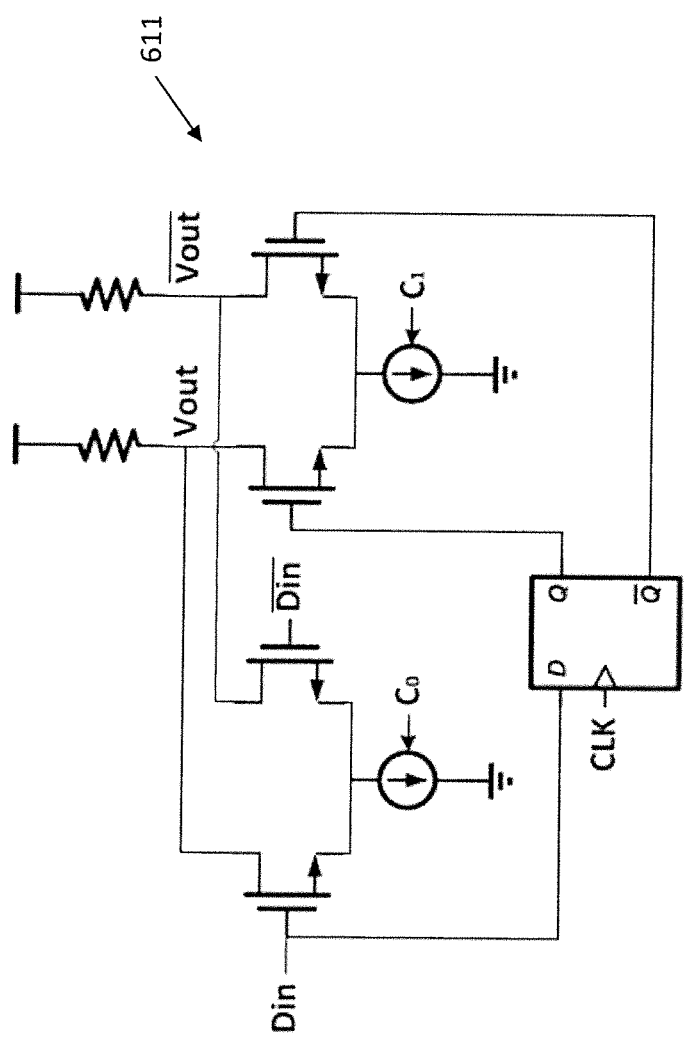
FIG. 6 shows an example hardware implementation of de-emphasis signal converter.
Figure 7:
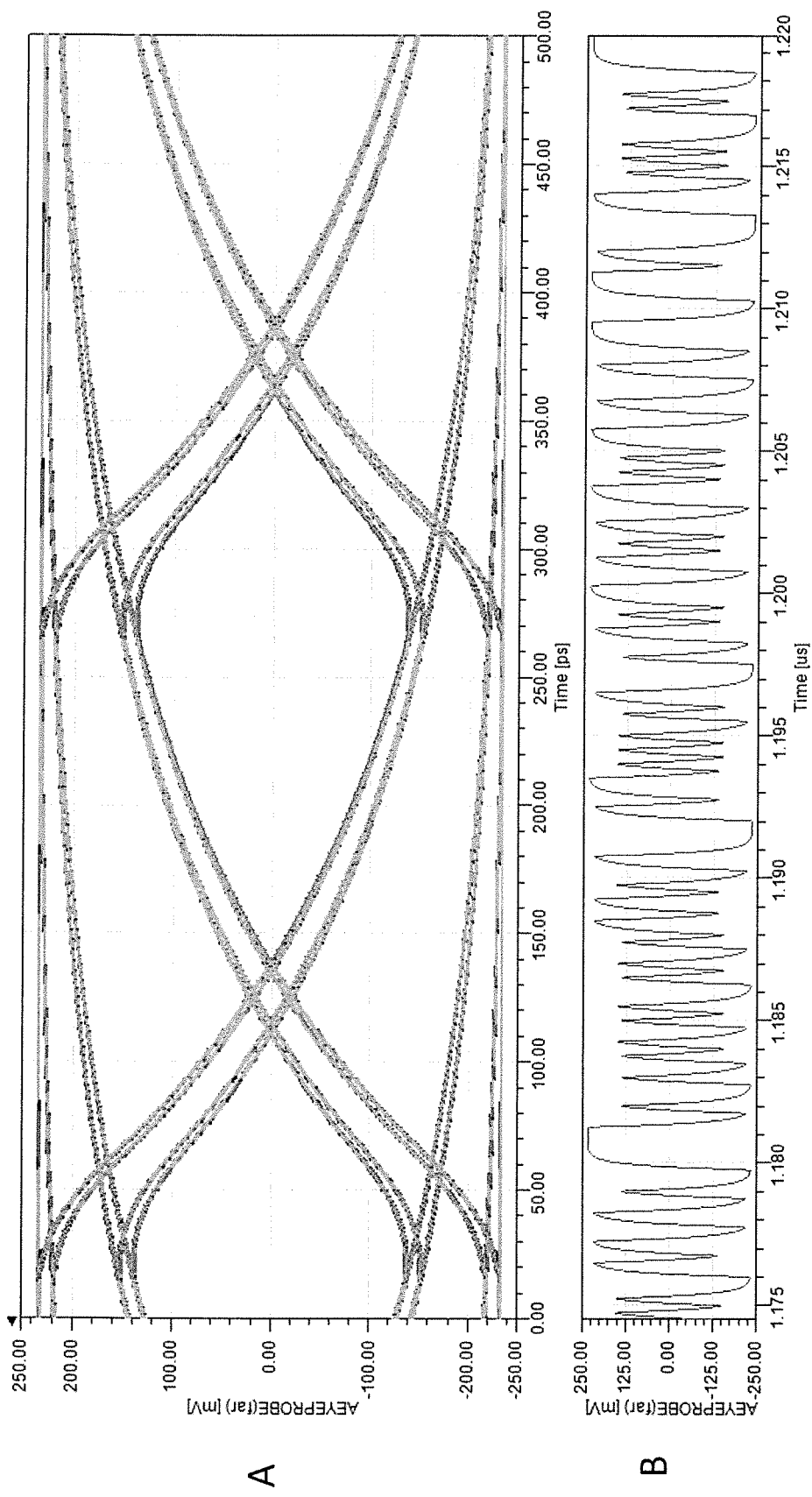
FIG. 7 provides graphs of an eye diagram and low frequency transient response of a microLED without equalization.
Figure 8:
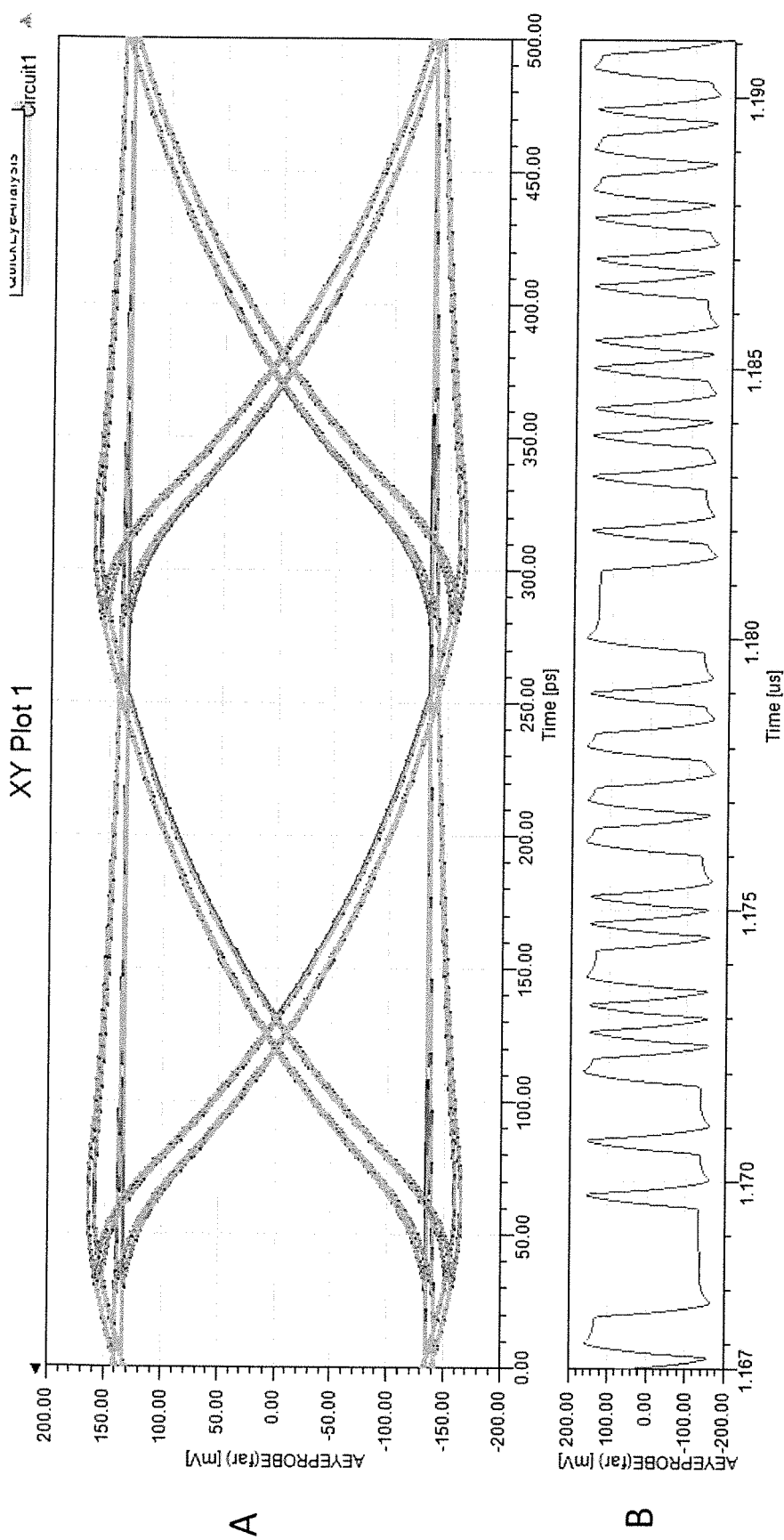
FIG. 8 provides graphs of an eye diagram and low frequency transient response of a microLED with equalization.
Figure 9:
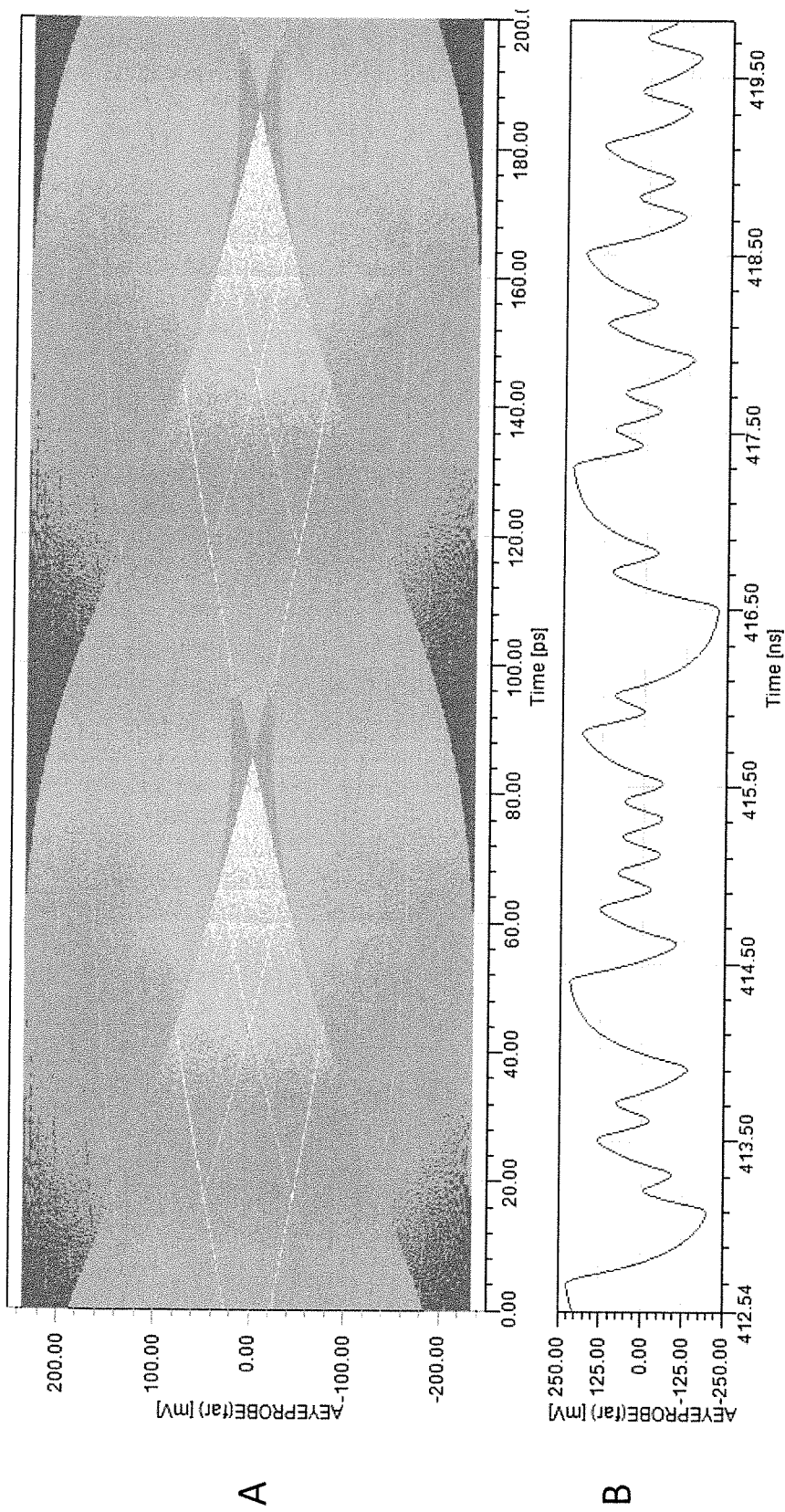
FIG. 9 provides graphs of an eye diagram and high frequency transient response of a microLED without equalization.
Figure 10:
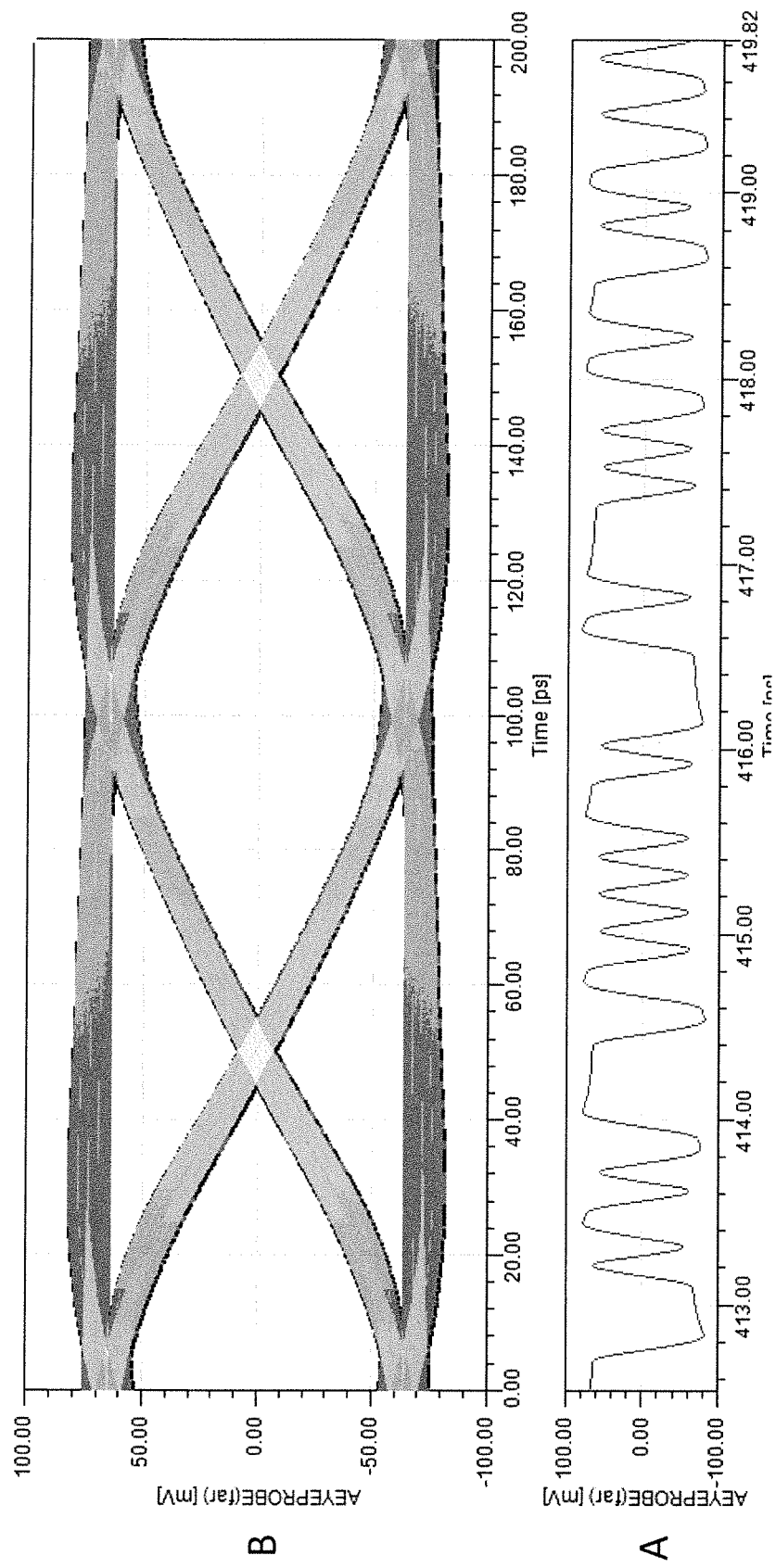
FIG. 10 provides graphs of an eye diagram and high frequency transient response of a microLED with equalization.

In some embodiments the de-emphasis signal converter/feed forward TX equalizer (FFE) is as shown in FIGS. 5 and 6. In most embodiments the de-emphasis signal converter/FFE is a filter that shapes the transfer function of the combined microLED-driver-channel response to effectively boost the high frequencies to make up for the loss due to a low pass response of the microLED modulation and other impairments of the transmission channel. A block diagram 513 and semi-schematic 511 of a de-emphasis implementation is shown in FIG. 5. Three copies of the drive signals (a,b,c) are used to form the de-emphasized signal. Signal 'b' is a main cursor and signals 'a' and 'c' are pre- and post-cursors. The pre- and post-cursors are appropriately time shifted and added to the main cursor with a certain scale. The scale or the amount of de-emphasis may be determined from a microLED calibration procedure, and chosen to compensate for the high frequency roll-off of the microLED response. An example hardware implementation 611 is shown in FIG. 6 as an example. FIGS. 7, 8, 9, and 10 present simulation results comparing the transmission eye diagram, for the cases without the de-emphasis FIGS. 7, 9 and for the case with the de-emphasis FIGS. 8, 10, with FIGS. 7, 8 relating to low frequency response and FIGS. 9, 10 relating to high frequency response. The use of FFE may allow for improved recovery of signals transmitted using high bandwidth limited emitters such as microLEDs.

Figure 11A:
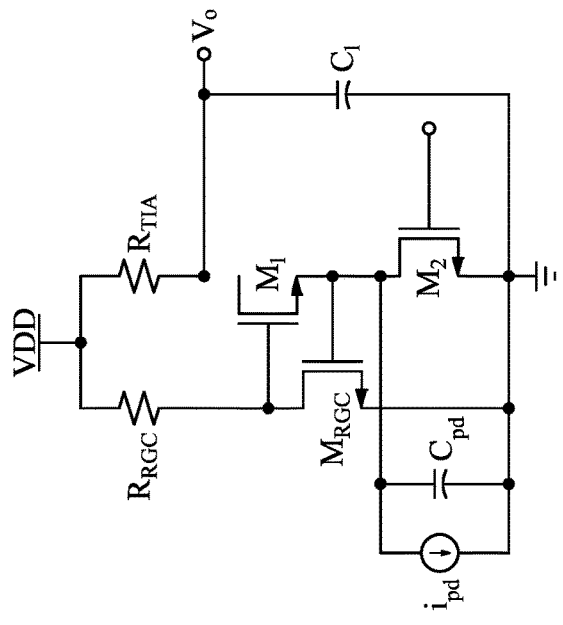
FIG. 11a-e are schematics of front end transimpedance amplifier architectures.
Figure 11B:
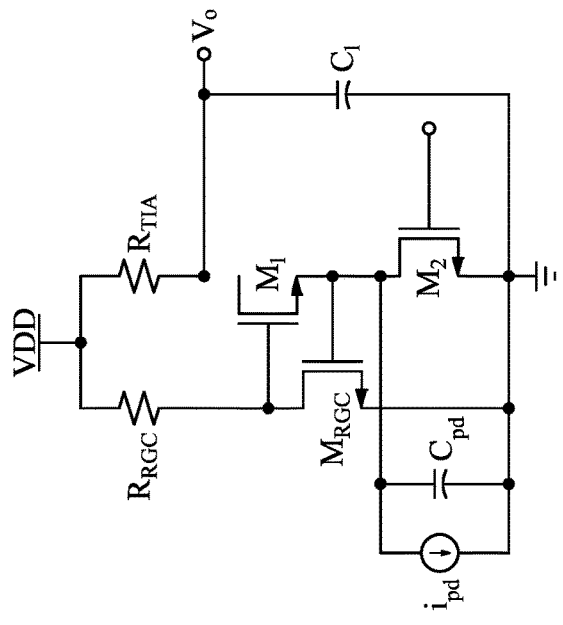
Figure 11C:
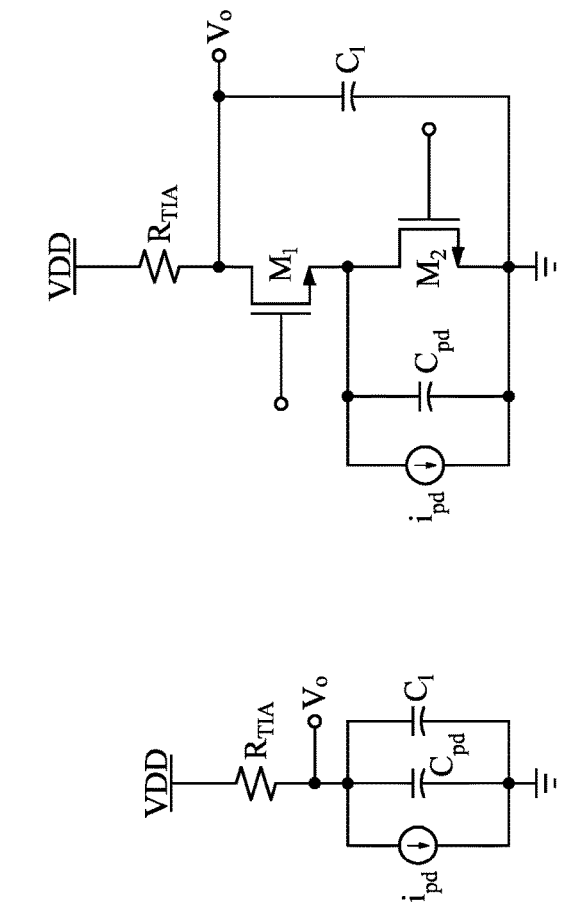
Figure 11D:
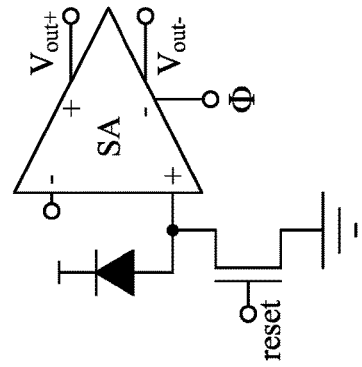
Figure 11E:
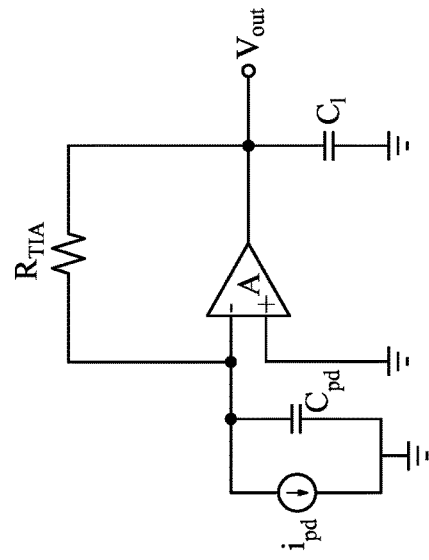

In some embodiments the transimpedance amplifier (TIA) can be integrated with the photodetector (PD_TIA). The front end of the TIA can be implemented using the following techniques: passive, resistor based; or active, transistor based; or shunt-shunt based; or switch capacitor with reset. Various front end TIA architectures are shown in FIGS. 11a-e. FIG. 11a shows a simple resistor configuration, FIG. 11b shows a common gate configuration, FIG. 11c shows a common gate with a regulated cascode configuration, FIG. 11d shows a shunt-shunt configuration, and FIG. 11e shows a sampling architecture with a sense amplifier (SA). For the switch capacitor/integrating architecture, clock recovery or dedicated clock line may be as shown in FIG. 4a to reset the integrator for each bit, as shown for example in FIG. 11e. The clock could be taken either from the optical signal by means of clock recovery or obtained from the TX side via an impedance matched copper line. One clock line could be shared for the entire microLED driven optical bus.

Figure 12:
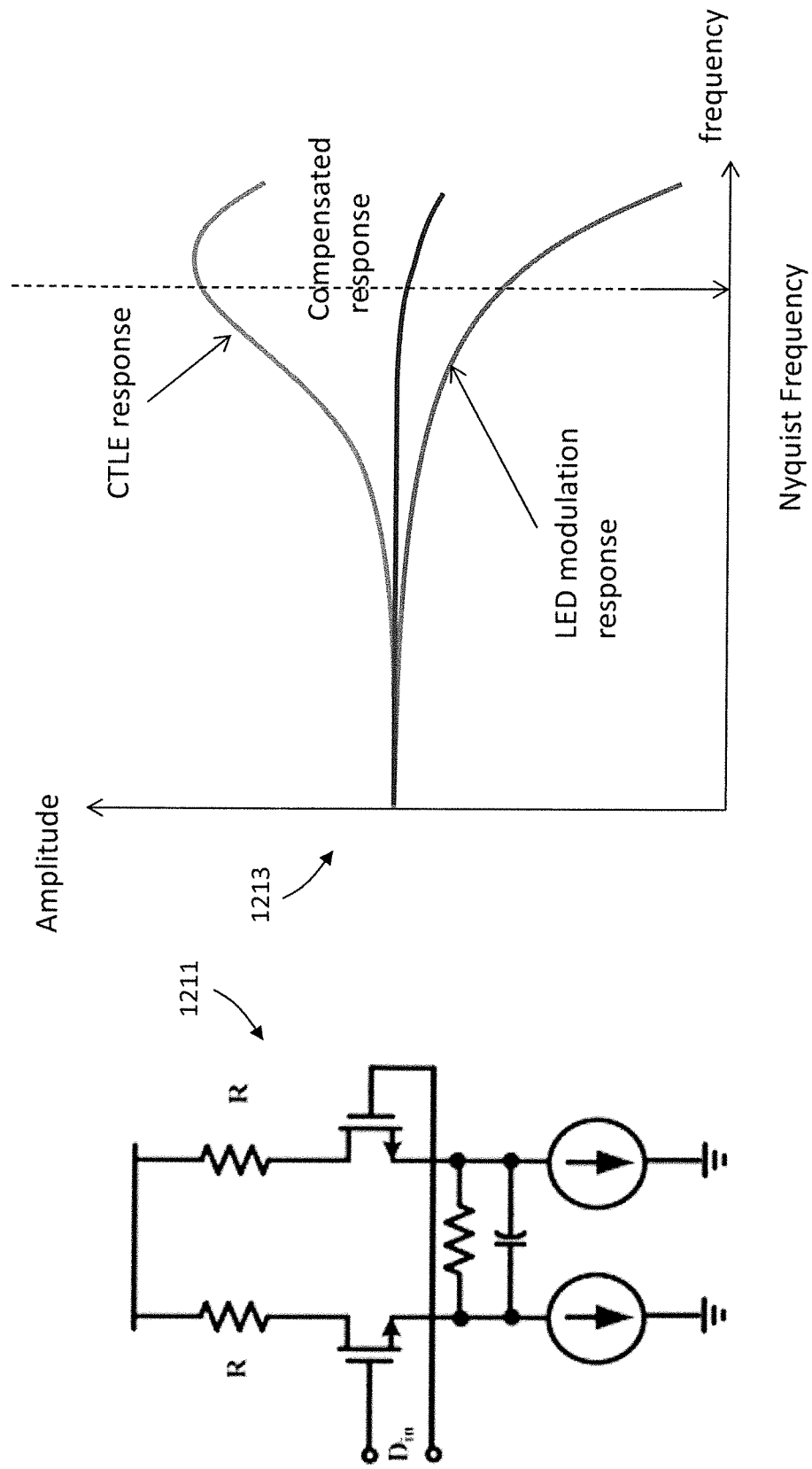
FIG. 12 provides an example schematic for a continuous time linear equalizer schematic and associated frequency response graph.

In some embodiments the continuous time linear equalizer (CTLE) at the receiver side may be implemented as a linear FIR or analog high pass filter as part of signal conditioning and could be implemented using a fixed or adjustable (tunable) configuration. An example CTLE circuit 1211 and frequency response graph 1213 are shown in FIG. 12. Depending on the modulation bandwidth of the microLED emitter and other channel impairments de-emphasis could be implemented only at the RX side or only at the TX side or both at RX and TX sides. Since equalization consumes extra power, a tradeoff between power consumption and equalization strength may be desired.

Figure 13:
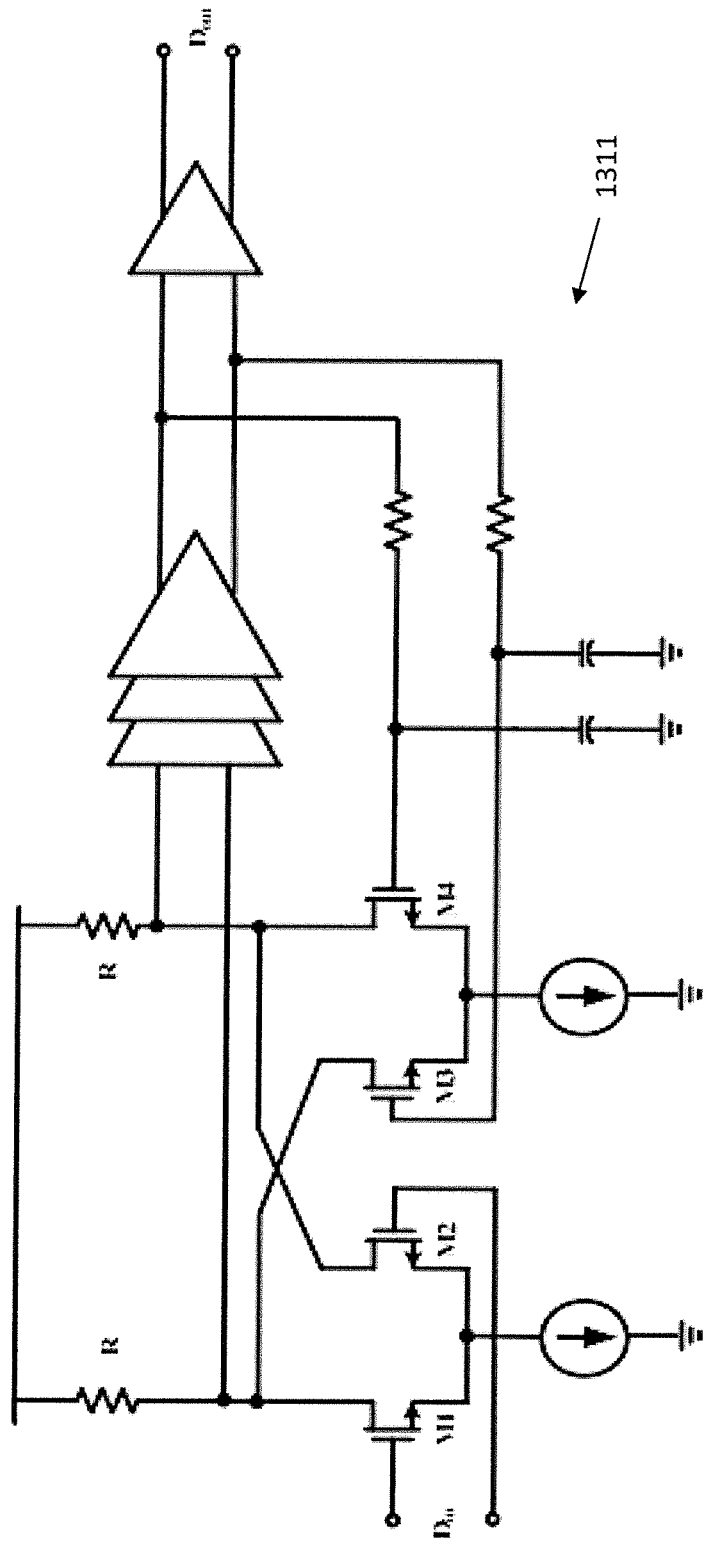
FIG. 13 provides an example schematic of a limiting amplifier.

In some embodiments a limiting amplifier is the intermediate stage between the CTLE and clock and data recovery circuitry, which may be considered a slicer. An example limiting amplifier circuit 1311 is shown in FIG. 13. In some embodiments the limiting amplifier exhibits high gain to provide sufficiently large voltage swings for the subsequent slicer. Preferably, the circuit bandwidth should be high enough to avoid inter-symbol interference (ISI). The limiting amplifier offset may also impact the receiver performance. Vertical shift of the signal with respect to the decision threshold may degrade the receiver sensitivity. The architecture of the limiting amplifier may comprise several identical gain stages comprising a limiting amplifier core, an offset cancellation feedback loop and an output buffer. The limiting amplifier core may provide sufficiently large gain and bandwidth, while continuous-time offset cancellation circuits introduce a lower cutoff frequency in the transfer function.

Figure 14:
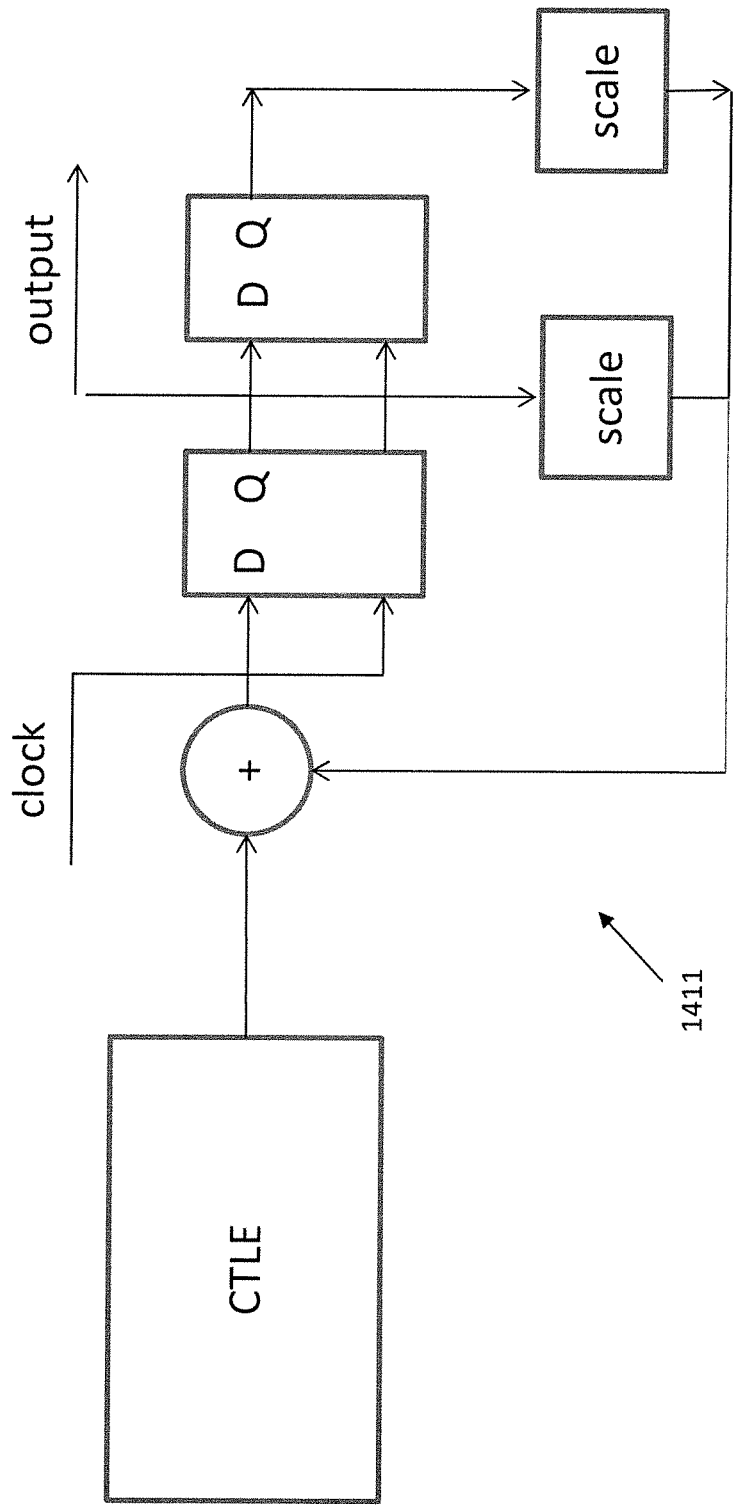
FIG. 14 is a block diagram of an example decision feedback equalizer.

Linear equalization techniques such as RX CTLE generally have a major limitation, which is noise. When noise (such as reflections or crosstalk) is present on the channel, CTLE may amplify the high-frequency noise right along with the data. In some embodiments a decision feedback equalizer (DFE) is used to mitigate ISI, generally without unduly amplifying the noise. FIG. 14 shows a block diagram 1411 of a simple example DFE implementation.

The slicer re-times the received data, generally making a decision every bit period. The slicer utilizes the clock provided to sample data streams. In some embodiments, under lock conditions, the rising edges of the clock are aligned with the data transitions while the falling edges of the clock sample the data in the middle of the symbol interval, or a middle of the data eye, depending on implementation.

In some embodiments use of controlled impedance lines in the transceiver for each lane is not done, due to power consumption restraints.

In some embodiments a training phase is applied to the transceiver while the data is sent through the link to adjust the taps for minimum bit error rate (BER). The setting is then programmed onto the transceiver electronics.

Figure 15:
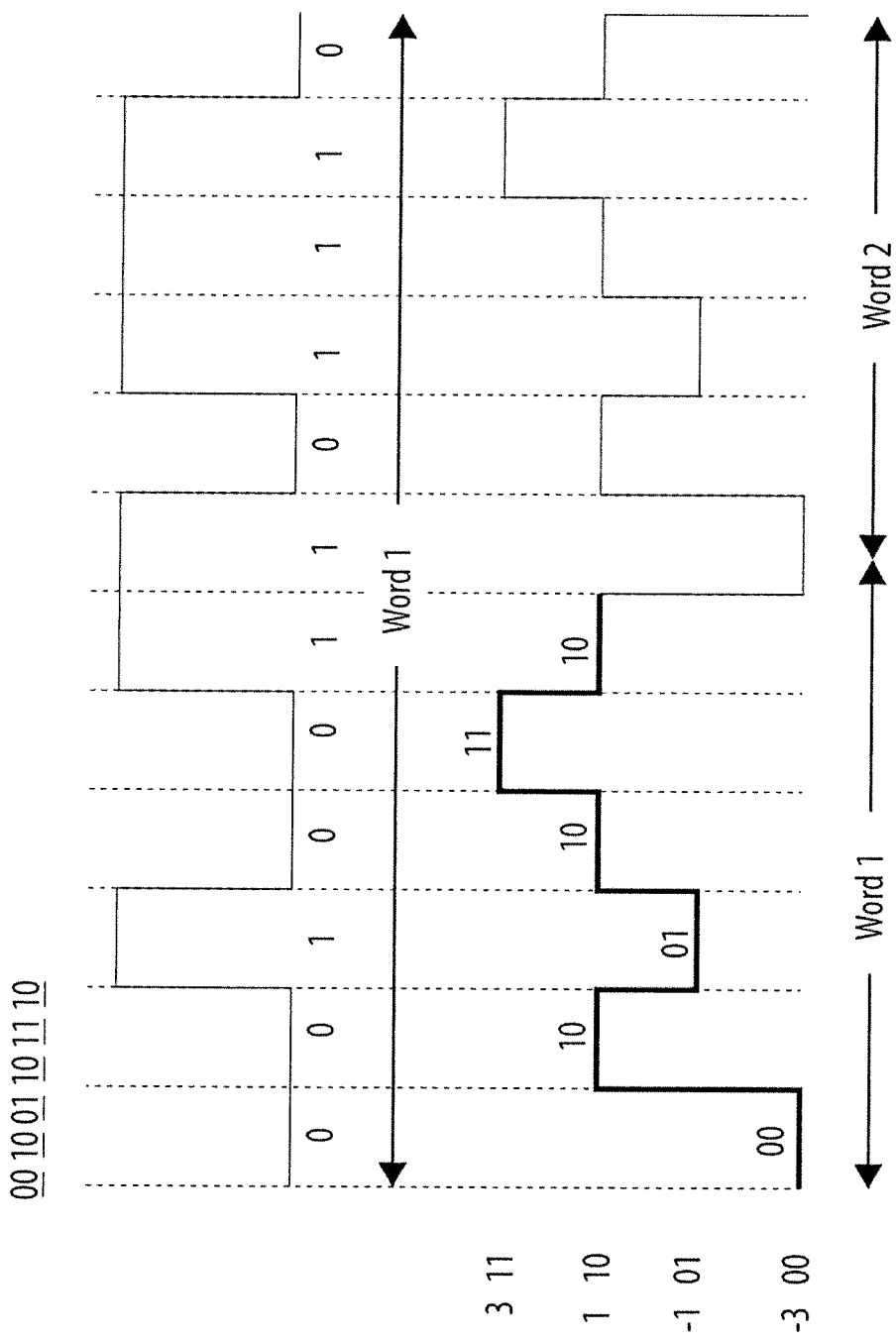
FIG. 15 shows an example timing diagram for PAM 4 signaling.
Figure 16:
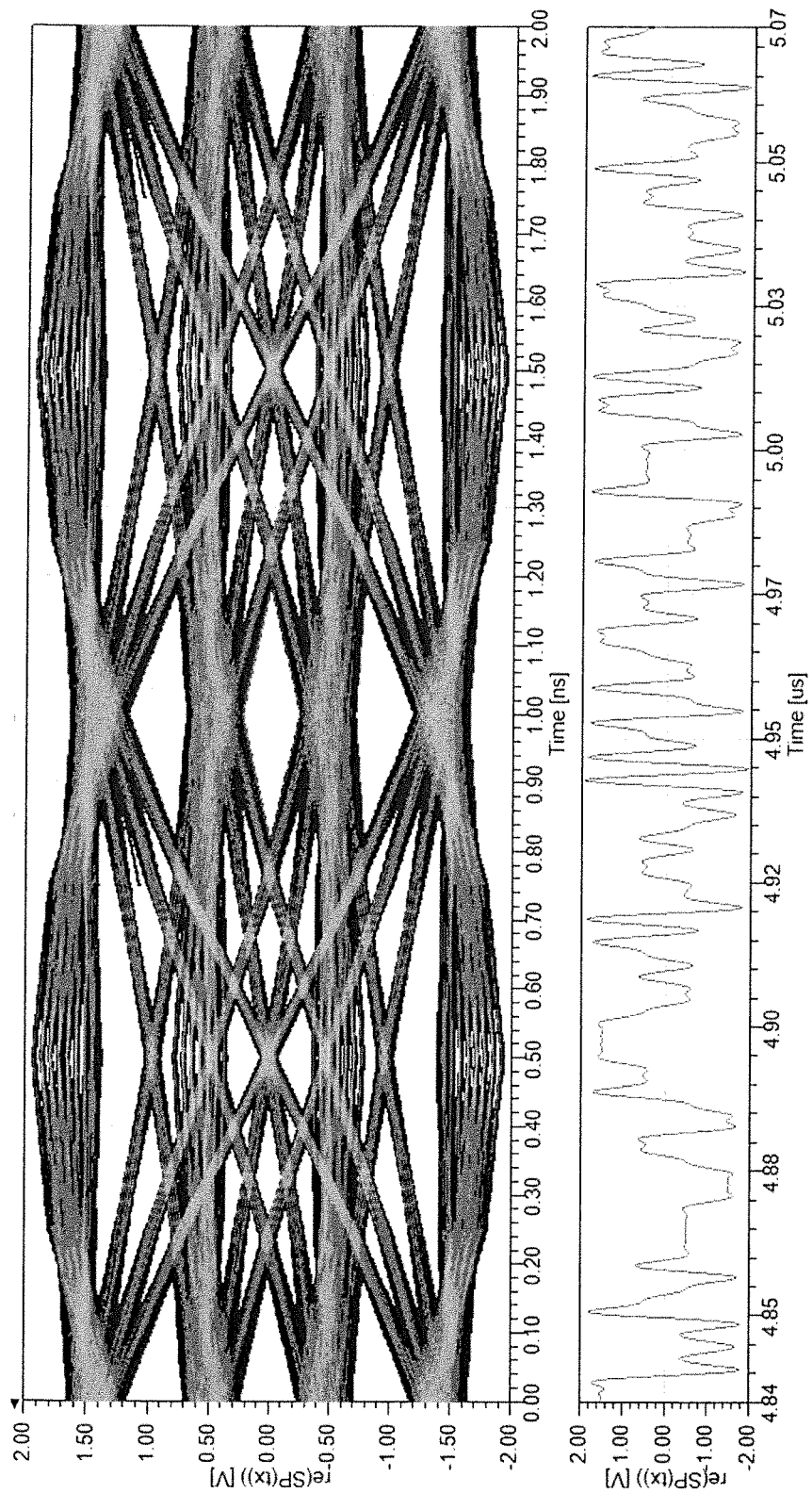
FIG. 16 provides graphs of a PAM-4 eye diagram and timing diagram.
Figure 17:
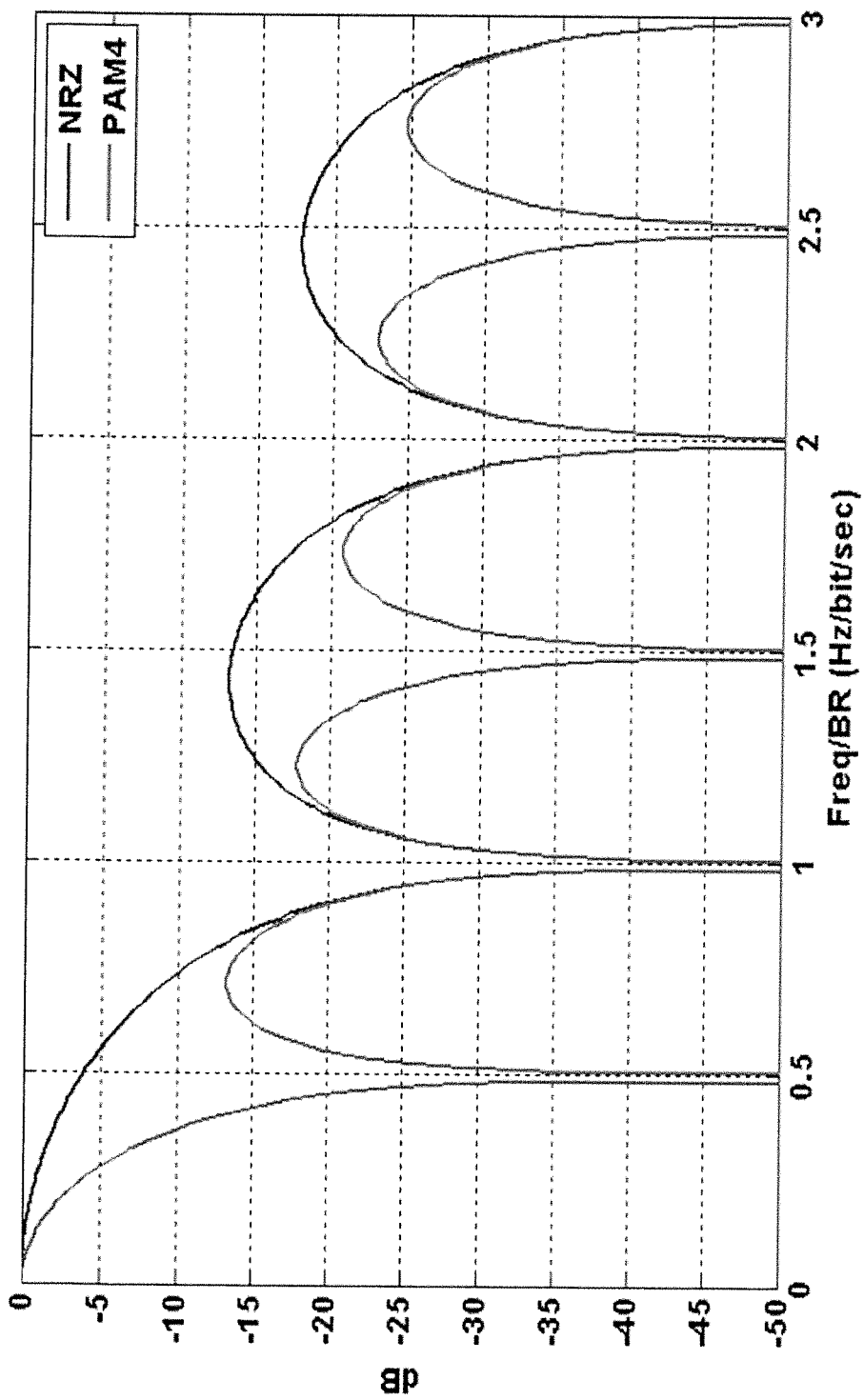
FIG. 17 is a graph illustrating PAM-4 power spectrum density.

In some embodiments the transceiver uses a multi-level bandwidth efficient signaling scheme, for example M-ary Pulse Amplitude Modulation (PAM). FIGS. 15, 16 present a PAM-4 modulation signal using microLEDs, with PAM-4 signaling shown in FIG. 15 and an eye diagram and timing diagram shown in FIG. 16. RF spectrum and Frequency per bit per sec are compared for NRZ PAM-4 in FIG. 17. For a given bandwidth, the PAM-4 modulation format is generally more efficient at the expense of the signal to noise ratio (SNR). In order to double the data rate at a given bandwidth, the signals to noise ratio (SNR) preferably is increased by at least 7 dB. In this case microLEDs can be operated at higher power and thus provide a higher signal to noise ratio.

Although the invention has been discussed with respect to various embodiments, it should be recognized that the invention comprises the novel and non-obvious claims supported by this disclosure.

What is claimed is:

1. A transceiver for integrated circuit chip-to-chip communication using microLEDs, comprising:
   a microLED driver;
   a de-emphasis signal converter/feed forward equalizer to equalize and boost a high frequency range of a signal from the microLED driver;
   a microLED configured to be driven by the signal and to emit light into an optical waveguide;
   a photodetector configured to receive light from the optical waveguide;
   a transimpedance amplifier integrated with the photodetector and configured to amplify an electrical signal from the photodetector;
   an equalizer to equalize the amplified electrical signal; and
   a limiting amplifier configured to receive the equalized amplified electrical signal;
   wherein the high frequency range of the signal is boosted to make up for any loss due to a low pass response of a microLED modulation.

2. The transceiver of claim 1, wherein the equalizer comprises a continuous time linear equalizer.

3. The transceiver of claim 1, further comprising clock and data recovery circuitry for recovering a clock signal and data from the amplified electrical signal.

4. The transceiver of claim 1, wherein the signal from the microLED driver is a PAM-N signal.

5. The transceiver of claim 1, further comprising a slicer and a decision feedback equalizer coupled to the limiting amplifier.

* * * * *